(12) United States Patent
Kljaic et al.

(10) Patent No.: US 8,288,912 B2
(45) Date of Patent: Oct. 16, 2012

(54) ELECTROMAGNETICALLY EXCITABLE COIL

(75) Inventors: Michael Kljaic, Freiberg (DE); Harald Bodendorfer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 12/599,410

(22) PCT Filed: Jun. 16, 2008

(86) PCT No.: PCT/EP2008/057525
§ 371 (c)(1),
(2), (4) Date: Nov. 9, 2009

(87) PCT Pub. No.: WO2009/000684
PCT Pub. Date: Dec. 31, 2008

(65) Prior Publication Data
US 2011/0156523 A1    Jun. 30, 2011

(30) Foreign Application Priority Data
Jun. 22, 2007 (DE) .................. 10 2007 029 306

(51) Int. Cl.
*H02K 3/34* (2006.01)
*H02K 3/46* (2006.01)

(52) U.S. Cl. . 310/208; 310/222; 310/224; 310/216.069; 310/179; 310/180

(58) Field of Classification Search .................. 310/208, 310/222, 224, 216.069, 179, 180
See application file for complete search history.

(56) References Cited

U.S. PATENT DOCUMENTS

| 7,126,246 | B2 * | 10/2006 | Izumi et al. | 310/208 |
| 2002/0113518 | A1 * | 8/2002 | Hsu | 310/254 |
| 2003/0051616 | A1 | 3/2003 | Kinley et al. | |
| 2005/0212644 | A1 * | 9/2005 | Yoshimori | 336/224 |
| 2006/0033395 | A1 * | 2/2006 | Izumi et al. | 310/208 |
| 2009/0085422 | A1 | 4/2009 | Kusawake et al. | |

FOREIGN PATENT DOCUMENTS

| CH | 270657 | 9/1950 |
| CH | 329523 | 4/1958 |
| CH | 338897 | 6/1959 |
| DE | 961191 | 4/1957 |
| DE | 1013004 | 8/1957 |
| DE | 1089878 | 9/1960 |
| DE | 1883086 | 11/1963 |

(Continued)

OTHER PUBLICATIONS

Translation of foreign document JP 2000166193.*

(Continued)

*Primary Examiner* — Quyen Leung
*Assistant Examiner* — Alex W Mok
(74) *Attorney, Agent, or Firm* — Kenyon & Kenyon LLP

(57) ABSTRACT

An electromagnetically excitable coil having a wire, the wire being wound around a wire holder in one winding direction, the wire having a winding start, which generally is disposed at a first end of the coil, and a winding end, which generally is disposed at the same end of the coil, using an uneven number of winding layers, the coil having an elongated cross-section and the cross-section having a longer side and a shorter side, the wire being routed from the second end of the coil to the first end of the coil while forming at least one wire crossing at the shorter side of the cross-section.

13 Claims, 15 Drawing Sheets

FOREIGN PATENT DOCUMENTS

| | | | | |
|---|---|---|---|---|
| DE | 1220030 | | | 6/1966 |
| DE | 1221352 | | | 7/1966 |
| DE | 1905123 | | | 8/1970 |
| DE | 20 2007 007579 | | | 8/2007 |
| DE | 20 2007 007580 | | | 8/2007 |
| JP | 03232202 | A | * | 10/1991 |
| JP | 05328651 | A | * | 12/1993 |
| JP | 2003-324886 | | | 9/1997 |
| JP | 9232125 | | | 9/1997 |
| JP | 11150900 | A | * | 6/1999 |
| JP | 11299132 | A | * | 10/1999 |
| JP | 2000 166193 | | | 6/2000 |
| JP | 2001045691 | A | * | 2/2001 |
| JP | 2003 009444 | | | 1/2003 |
| JP | 2004312795 | A | * | 11/2004 |
| JP | 2006121868 | A | * | 5/2006 |
| JP | 2006129622 | A | * | 5/2006 |
| JP | 2006129623 | A | * | 5/2006 |
| JP | 2006296146 | A | * | 10/2006 |
| JP | 2007089346 | A | * | 4/2007 |
| JP | 2007180058 | A | * | 7/2007 |
| JP | 2008035603 | A | * | 2/2008 |
| JP | 2009118574 | A | * | 5/2009 |
| WO | WO 2007/055210 | | | 5/2007 |

OTHER PUBLICATIONS

Translation of foreign document JP 2000166193 A (Foreign Document published: Jun. 16, 2000).*

International Search Report, PCT International Patent Application No. PCT/EP2008/057525, dated Dec. 16, 2008.

* cited by examiner (I-I)

(I-I)

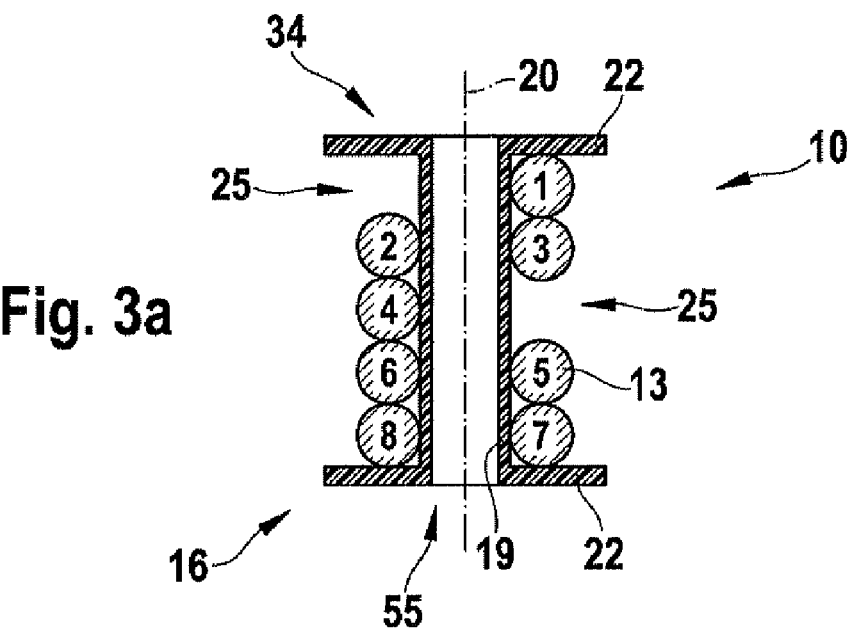
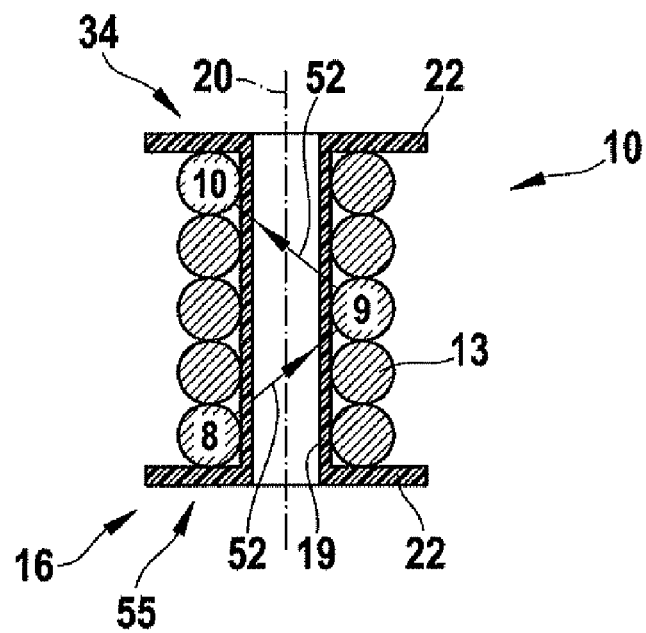

ELECTROMAGNETICALLY EXCITABLE COIL

FIELD OF THE INVENTION

The present invention relates to an electromagnetically excitable coil as it is used in electric machines. The purpose of such coils is, for example, to excite a stator electromagnetically and to induce the movement of a rotor in this way.

BACKGROUND INFORMATION

In the case of stators of large-sized electric machines, the stator is usually equipped with a multitude of radially inwardly directed stator teeth, each being surrounded by a coil. Viewed from radially outside or radially inside, these coils normally have a somewhat elongated cross-section, which means that the coil extends in the axial direction of the electric machine (axial direction being defined by the axis of rotation of the rotor) via the longer side of the coil, while the shorter side of the coil is aligned in the circumferential direction of the stator. In order to obtain the highest possible performance of the electric machine, it is necessary to place the tightest possible package of the coils at the inner circumference of the stator. On the other hand, the winding of the coil from the radial outside to the radial inside with respect to the machine geometry in turn frequently entails the problem that the wire of the coil must be routed from radially inside back to the radial outside without further enlarging the width of the coil when viewed in the circumferential direction.

SUMMARY

For coils having an uneven number of windings, one object of the present invention is to route the wire across the previously wound windings to the axial end of the coil, where the winding start is positioned, after the final winding, without enlarging the effective width of the coil in the circumferential direction in the process.

According to one preferred development of the present invention, at least the final winding layer—that is to say, possibly also only the single winding layer—is wound while forming at least one winding gap. The section of the wire that follows the wire crossing is then placed in this one winding gap before it is positioned at the first end of the coil by its winding end. As a result, the wire is practically wound around the coil one more time (two winding gaps) before its provided winding end, so that the wire is securely positioned after the wire crossing. This prevents the wire from detaching or sliding off, in particular in front of the wire crossing and thus on the side having an orientation in the circumferential direction. The latter is of particular importance since such sliding would cause the coil to become broader in the circumferential direction, which, among other things, is to be prevented by the present invention. Furthermore, such slippage of the wire would have the result that the required wire insulation, which is provided anyway, is damaged.

If the coil is a relatively long coil when viewed in the radial direction, and if the wire were positioned at a relatively steep position after the wire crossing, then the wire could slip from its position in front of the wire crossing since the winding typically has some slack. To prevent this, the at least one winding gap is positioned between the first end and the second end of the coil and preferably positioned centrically and/or at the intermediate positions. For instance, the winding gap may be placed one third the way down the length, and a further winding gap may be placed another third the way down the length of the coil. As a consequence, the wire crossing, i.e., the wire intersecting the other wires, is routed across the windings in relatively flat fashion, so that a detachment of the wire in front of the wire crossings is highly unlikely.

According to a further exemplary embodiment, the coil may have complete winding layers exclusively, and only the outermost layer may have at least one winding gap.

According to another development of the present invention, the coil has at least three winding layers, the outermost layer being wound only over a portion of the coil, and the outermost winding layer and the one disposed directly underneath each having at least one winding gap. Such a system, for one, has the advantage that the winding gap provided in the outermost layer may be used to supply wire to the beginning of the outermost winding, which is obviously facing away from the first end of the coil, without causing a widening of the coil in the circumferential direction, where this is not desired; for another, the winding gap in the winding layer directly underneath the outermost winding layer has the result that, once the outermost layer has been wound, the wire is able to be routed back to the first end of the coil without the risk of slippage at the axial end face (narrow side) either.

If the coil is designed in such a way that it has cross-sections of different size between its two axial ends relative to the coil or winding axis, i.e., axially on the inside and axially on the outside, then an excellent compromise may be achieved between required material for the flux guidance in the stator iron, which means also in the stator gear teeth surrounded by the coil, and the space utilization in the annular section of the stator where the teeth are disposed. In one special development of the present invention, the coil is to have a conical interior chamber at this location from one axial end to the other axial end in the radial direction (i.e., in the direction of the machine axis), which interior chamber tapers radially inwardly, in particular. If the outer, incomplete winding layer is disposed at the end having the smaller cross section, then an optimal result is able to be achieved with regard to flux guidance in the tooth and also with regard to space utilization of the coil around the tooth.

BRIEF DESCRIPTION OF THE DRAWINGS

The present invention is explained in detail below with reference to several exemplary embodiments shown in the figures.

FIG. 3*a* and FIG. 3*b* show a third exemplary embodiment in two winding states.

DETAILED DESCRIPTION OF EXAMPLE EMBODIMENTS

Figure 1A:
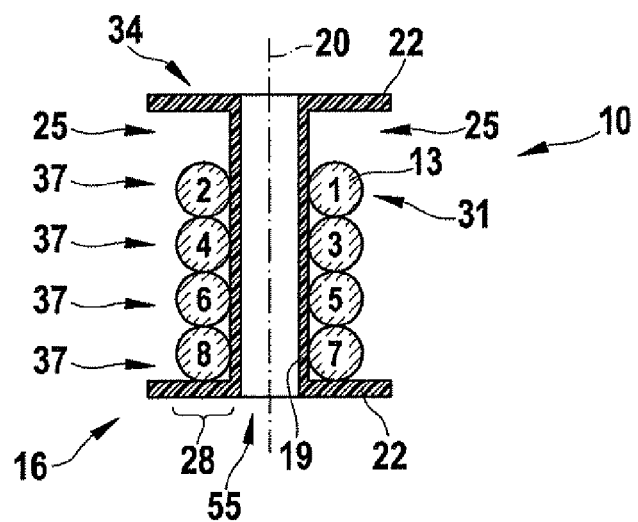
FIG. 1*a* and FIG. 1*b* show a longitudinal section through a coil according to a first exemplary embodiment, in two winding states.

FIG. 1 shows in the form of a longitudinal section an electromagnetically excitable coil 10, which consists of a wire 13, which is wound around a wire holder 16 in one winding direction. If coil 10 is viewed from the direction of the upper axial end in this case, the winding direction is defined such that wire 13 is wound around a sleeve section 19 or axis 20 of wire holder 16 in counter-clockwise fashion. To obtain a clear axial stop for wire 13, sleeve section 19 is provided with a collar 22 at each axial end. In this exemplary embodiment as also in all further exemplary embodiments, it is specified that first end 34 of coil 10 is the upper end of coil 10 in this exemplary embodiment. Coil 10 according to this exemplary embodiment is wound in the following manner: First, a winding gap 25 around sleeve section 19 is left open at first end 34 of coil 10, so that the single winding layer 28 makes no direct contact with collar 22 of first end 34 of coil 10 via its winding start 31, but generally is disposed only at first end 34. Starting from this position of winding start 31, wire 13 is wound around sleeve section 19 in the defined winding direction in four windings 37 in this instance. The circles shown in FIG. 1a schematically represent the cross-sections of wire 13 in the sectional plane. The numbers inscribed inside the circles represent the sequence in which wire 13 passes through the sectional plane. A circle with the inscribed number "1" thus represents the first pass of wire 13 through the sectional plane, while a circle with the number "2" represents the second pass of wire 13 through the sectional plane. The inscribed numbers thus establish a clear assignment between the individual passes and as a consequence also a clear indication of the way in which wire 13 is wound around sleeve section 19. For reasons of clarity and in an effort to concentrate on the essential aspects in the illustration of the present invention, not all passes have been numbered.

Figure 1B:
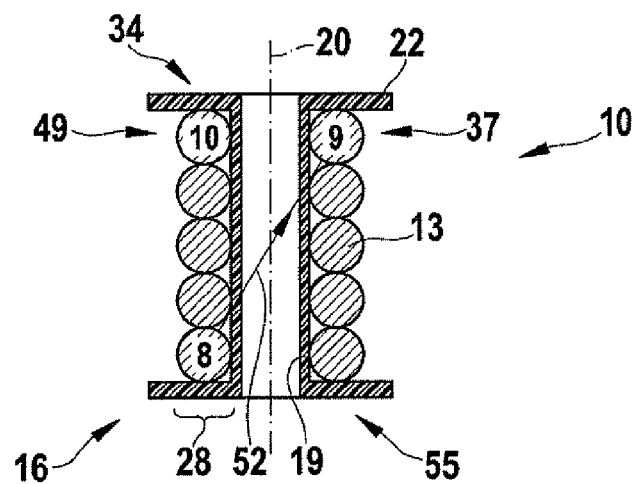

Accordingly, FIG. 1b illustrates the way in which the wire, having completed the eighth pass through the sectional plane, is routed from the bottom left position in first winding plane 28 to first end 34 of coil 10, in order to then complete winding gap(s) 25 by a fifth winding 37 around sleeve section 19.

Figure 1C:
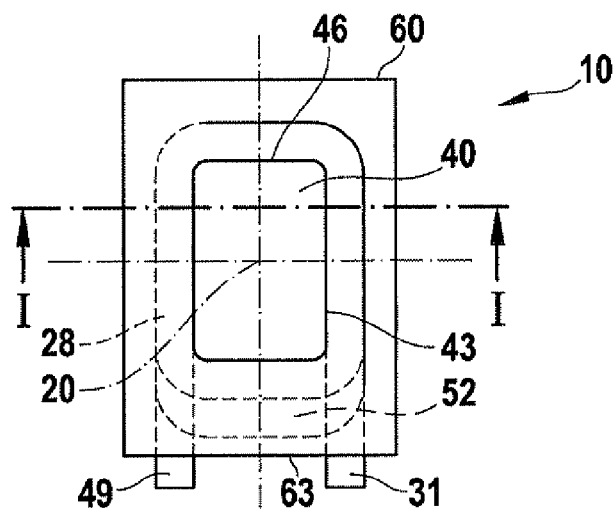
FIG. 1*c* shows a plan view of the coil.

In this context, FIG. 1c schematically illustrates the axial plan view of coil 10 from above. As can be seen quite clearly, coil 10 has an elongated cross-section 40, which has a longer side 43 and a shorter side 46. Winding start 31 and winding end 49 can also be seen in FIG. 1c. Also drawn in FIG. 1c is a winding layer 28, which is crossed by a wire crossing 52 on shorter side 46, as can be gathered clearly from the figure. This wire crossing 52, when viewed together with FIG. 1b, represents the section of wire 13 that extends from the eighth pass of wire 13 through the sectional plane to the ninth pass of wire 13 through the sectional plane. This wire crossing is symbolically denoted by the arrow in FIG. 1b.

FIG. 1 thus shows an electromagnetically excitable coil 10 having a wire 13, which wire 13 is wound around a wire holder 16 in one winding direction, with a winding start 31, which is essentially disposed at a first end 34 of coil 10. Winding end 49 is essentially disposed at same end 34 of coil 10. Coil 10 also has an uneven number of winding layers 28, in this case, one. Coil 10 has an elongated cross-section 40, which has a longer side 43 and a shorter side 46, and wire 13 is routed from a second end 55 of coil 10 to first end 34 of coil 10 while forming at least one wire crossing 52 on shorter side 46 of cross-section 40.

It was mentioned that winding start 31 is to be situated generally at first end 34 of the coil. This means, for example, that winding start 31 may be placed directly at first end 34 of coil 10, but if called for, it also includes a second or possibly also an additional winding position, for instance, in the vicinity of first end 34. This exemplary embodiment also shows that the last and, in this instance single, winding layer 28 is wound while forming at least one winding gap 25, and that a section of wire 13 following wire crossing 52, i.e., the wire section bearing number 9 around the pass of wire 13 through the sectional plane, is situated in the at least one winding gap 25 prior to being positioned at first end 34 of coil 10 by its winding end 49.

Figure 2A:
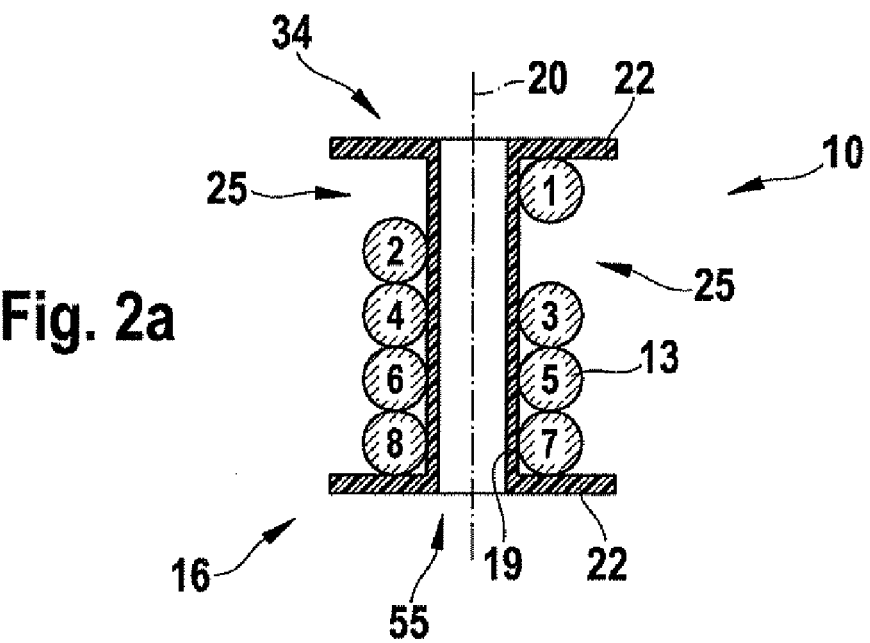
FIG. 2*a* and FIG. 2*b* show a second exemplary embodiment in two winding states.
Figure 2B:
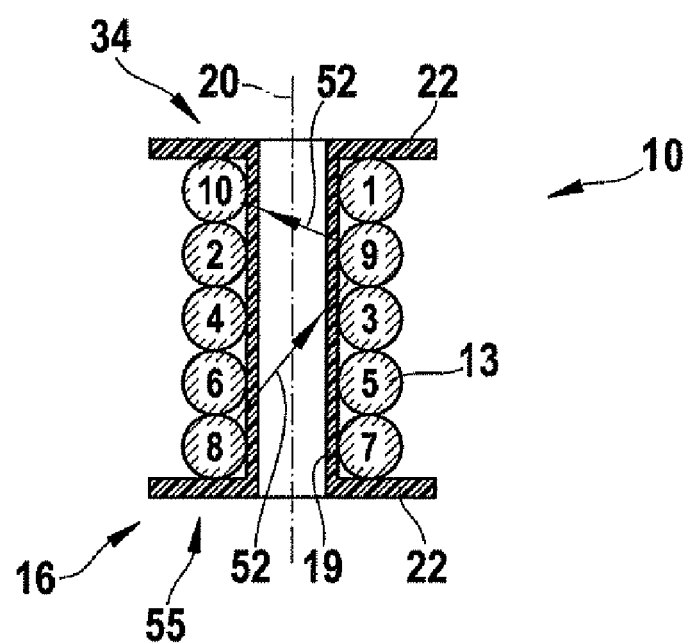
Figure 4A:
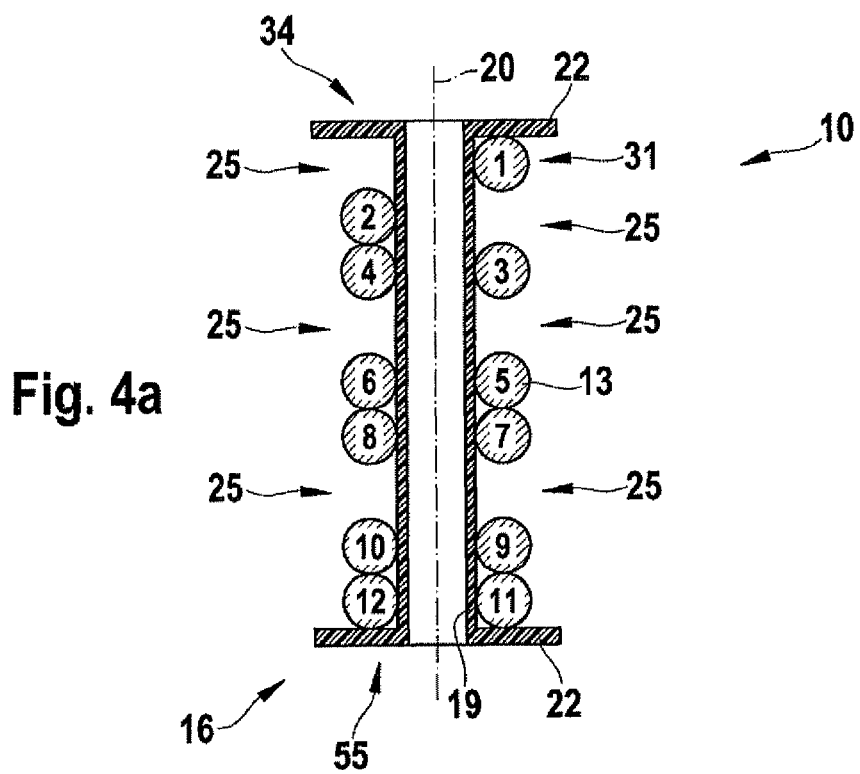
FIGS. 4*a, b, c, d* show a winding in four different winding states according to a fourth exemplary embodiment.
Figure 4B:
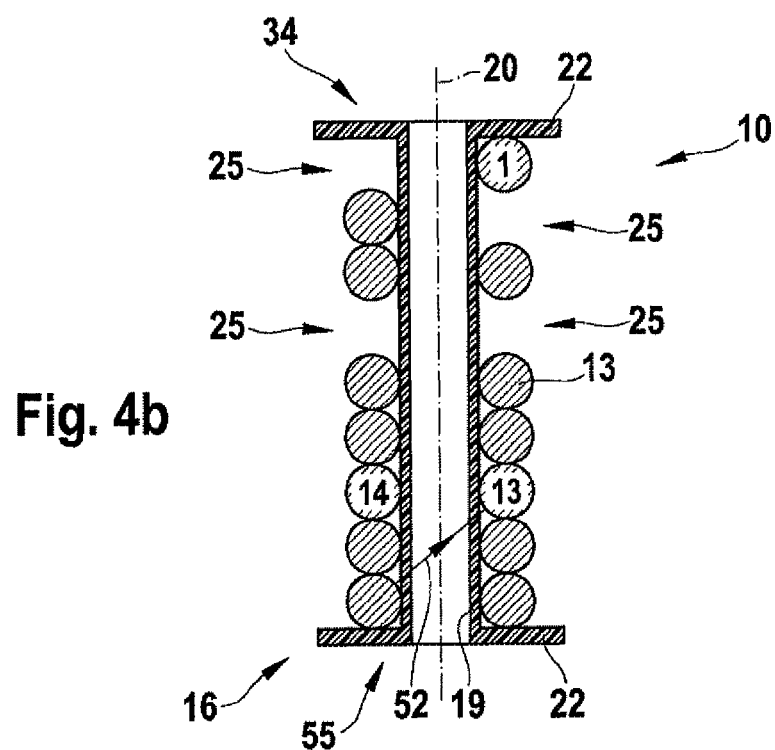
Figure 4C:
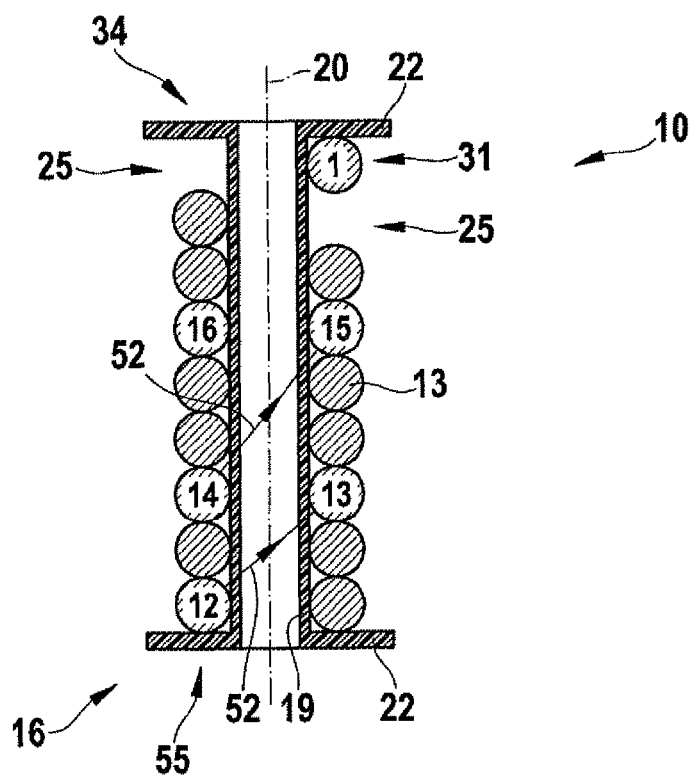
Figure 4D:
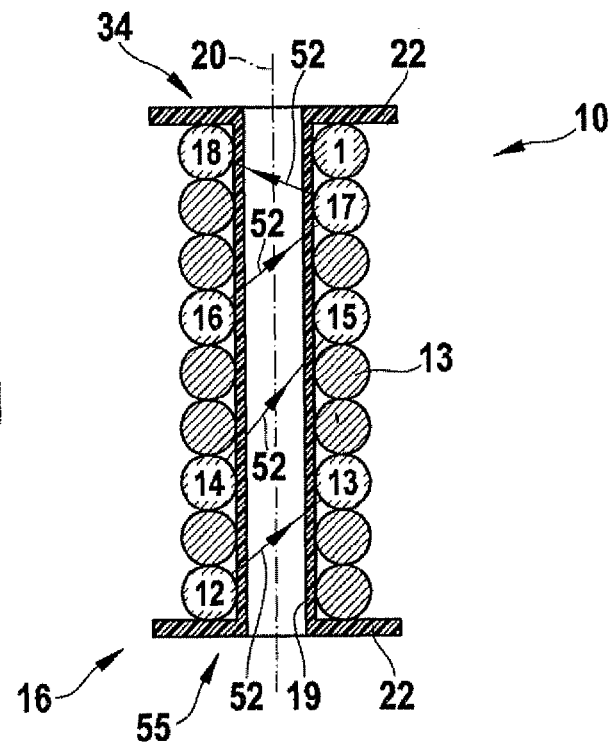

FIG. 2a shows a second exemplary embodiment of coil 10 in an analogous representation. This second exemplary embodiment illustrates a similar configuration in analogous schematic manner, so that generally only the differences are addressed here. Once again, wire 13 has been wound around sleeve section 19 eight times in a single winding layer 28; in this case, winding gaps 25 have been positioned at first end 34 of coil 10 only partially. Here, one winding gap 25 is placed directly at first end 34 of coil 10, while the other winding gap 25 is essentially placed at first end 34 of coil 10. In this instance, the exemplary embodiment has two wire crossings 52 so that the wire section between the longitudinal-section passes 9 and 10 crosses wire 13 between longitudinal-section passes 1 and 2. Wire crossing 52 between longitudinal-section passes 8 and 9 crosses the windings between the longitudinal-section passes from 2 to 3, 4 to 5, and 6 to 7.

The exemplary embodiment according to FIGS. 3a and 3b has a winding gap 25 that is positioned at first end 34, and one that is positioned between the two ends 34 and 55 of coil 10. The winding diagram, as it is indicated by the numbers in the cross-sections, is clear and easy to comprehend and is based on the preceding examples.

As an additional exemplary embodiment, which is not shown here, it can be said by way of description that, for instance, first winding 37 is positioned directly at first end 34 of coil 10, so that both longitudinal-section passes 1 and 2 are disposed directly at first end 34. Following this first winding 37, two winding gaps 25, for example, would then be left, which would be placed at the position of longitudinal-section passes 1 and 2 according to FIG. 1a, for instance. As shown in FIG. 1a, the additional winding would then continue from longitudinal-section passes 3 through 8. From position 8, wire crossing 52 would then run to position "9", which would be situated at the second position in front of first end 34 of coil 10, and then be wound around sleeve section 19 one time. In this example as well, winding ends 31 and 49 would generally be positioned at the same end—in this case, first end 34—of coil 10.

FIG. 4 shows a further exemplary embodiment of a one-layer coil 10. The winding course is analogous to the explanation of the previous exemplary embodiments and denoted by the numbers in the circles, which symbolize the cross-sections of wire 13. Thus, winding start 31 begins directly at first end 34 of coil 13, to then be wound around sleeve section 19 a total of six times. In this case a plurality of winding gaps 25 is taken into account, which makes it possible to route wire 13 from the lowermost position, i.e., the position most proximate to second end 55, to first end 34 without allowing wire 13 to slip off at one of sides 46 or 43. Wire 13 is therefore returned to first end 34 via longitudinal-section passes 13, 14, 15, 16, 17 and 18, cf. also FIGS. 4b, c and d. On front side 60, cf. FIG. 1c, wire 13 crosses windings 37 a total of three times by wire crossings 52, and on rear side 63, cf. FIG. 1c, it crosses coil 10 once.

Figure 5A:
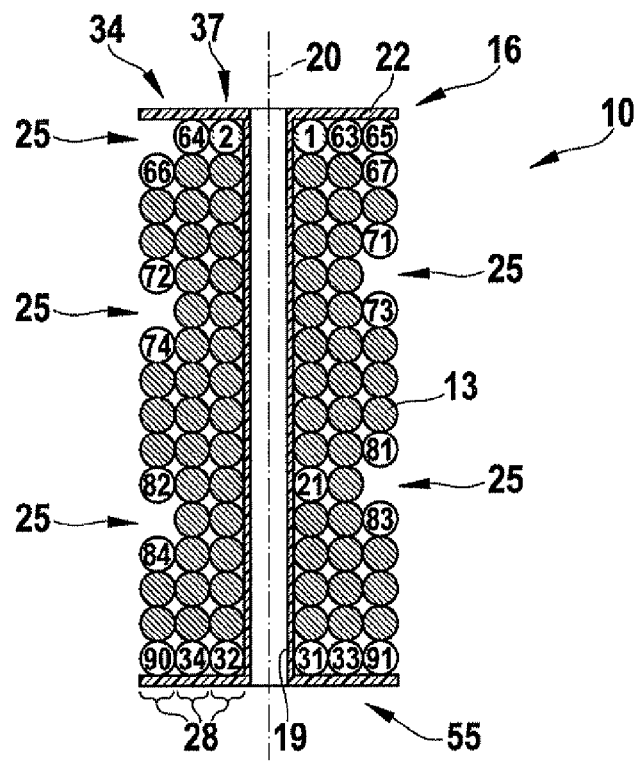
FIGS. 5*a, b, c* show a winding having three winding layers in three different winding states.
Figure 5B:
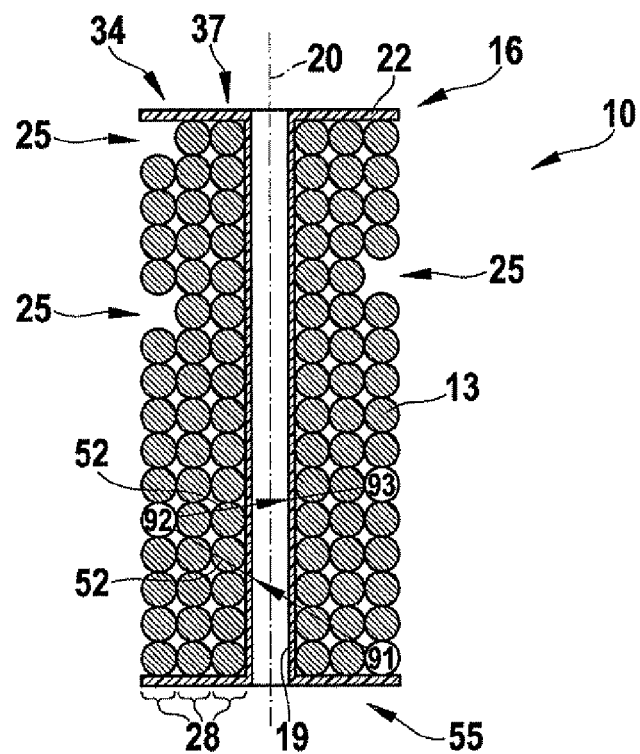
Figure 5C:
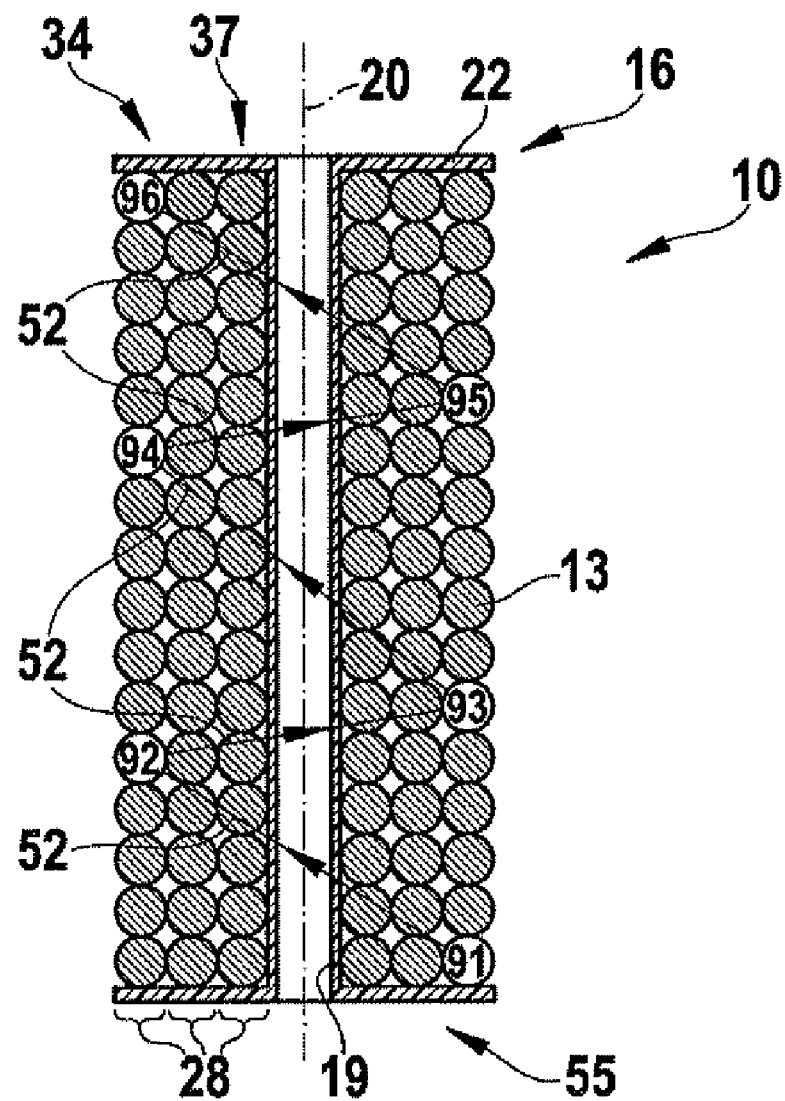

FIG. 5 shows a further exemplary embodiment, which has three winding layers 28 in this case.

FIG. 5 shows an additional exemplary embodiment of a coil 10, which has three winding layers 28. Analogous to the previous exemplary embodiments, windings 37 of the first, innermost winding layer 28 is wound around sleeve section 19 a total of sixteen times, beginning with wire cross-section 1, until the wire has arrived at position 32 at the other end 55 of coil 10. From this position 32, the wire is routed to position 33, thereby starting second winding layer 28 at second end 55 of coil 10. Beginning there, second winding layer 28 is wound directly onto first winding layer 28, and, after an additional sixteen windings, finally ends at first end 34 of coil 10 (position 10 and 64, respectively). Proceeding from there, third winding layer 28 is started at position 65 and wound to second end 55 of coil 10 while selectively providing winding gaps 25 in third winding layer 28. In this case, winding gaps 25 are both at first end 34 and additionally in approximately one third of windings 37 of outermost winding layer 28.

Once outermost winding layer 28 has finally arrived at other end 55 of coil 10 (position 91), then, starting from this last position 91, a wire crossing 52 is placed in first winding gap 25 when viewed from the direction of second end 55 of coil 10 (position 92); while forming an additional wire crossing 52, it is placed into next winding gap 25 (position 93) again, from there inserted into next winding gap 25 (position 94) while forming another wire crossing 52, whereupon wire 13 is placed in next winding gap 25 (position 95) while forming a next-to-last wire crossing 52. From there, while winding a final wire crossing 52, wire 13 is placed into last winding gap 25 when viewed from the direction of second end 55 of coil 10, and from there it is finally routed to the outside of coil 10. According to this exemplary embodiment, coil 10 has nothing but complete winding layers 28, outermost winding layer 28 having at least one winding gap 25, and, in this case, five winding gaps.

Figure 6A:
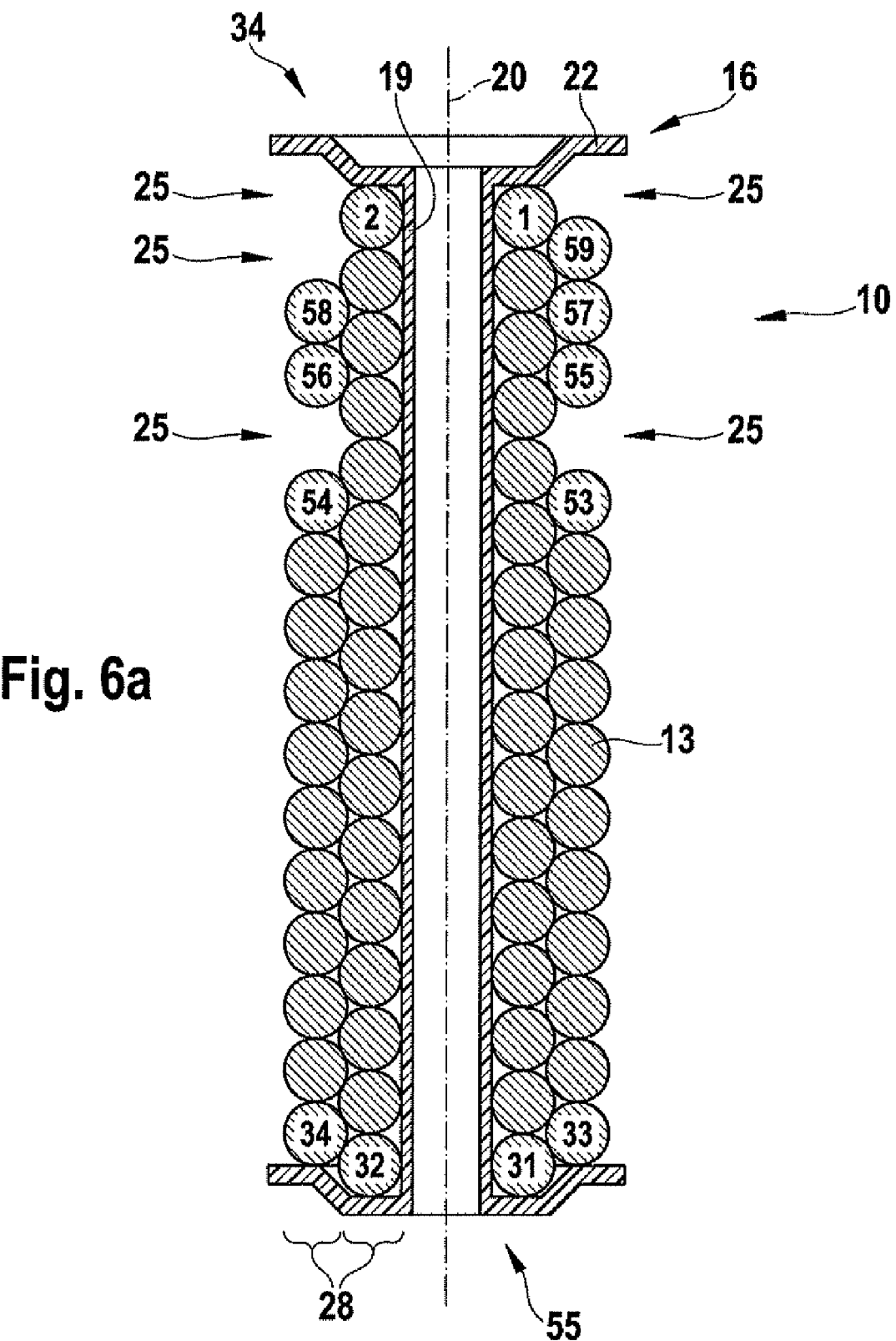
FIGS. 6*a, b, c, d* and *e* show a winding having three winding layers, the third winding layer being incomplete.
Figure 6B:
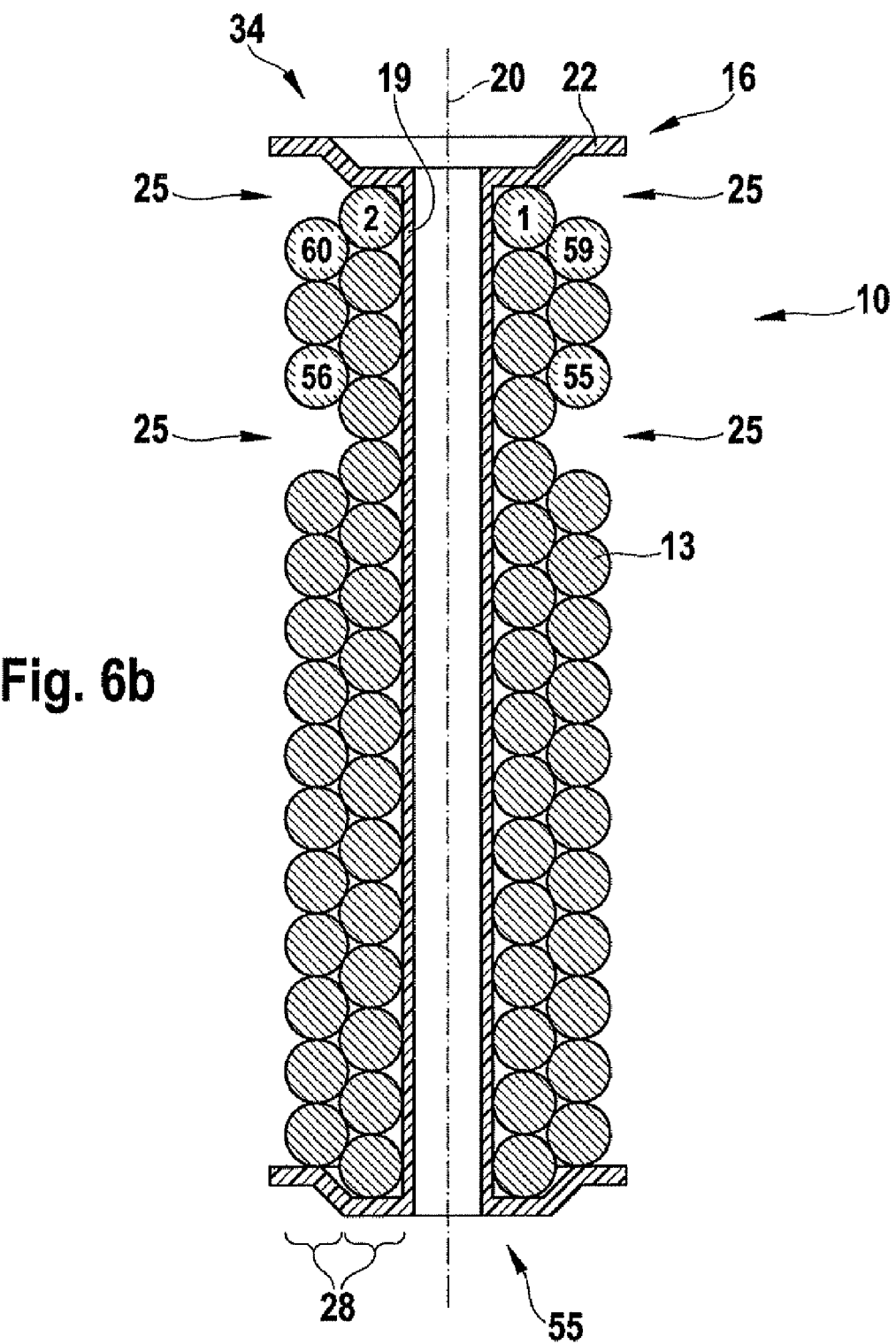
Figure 6C:
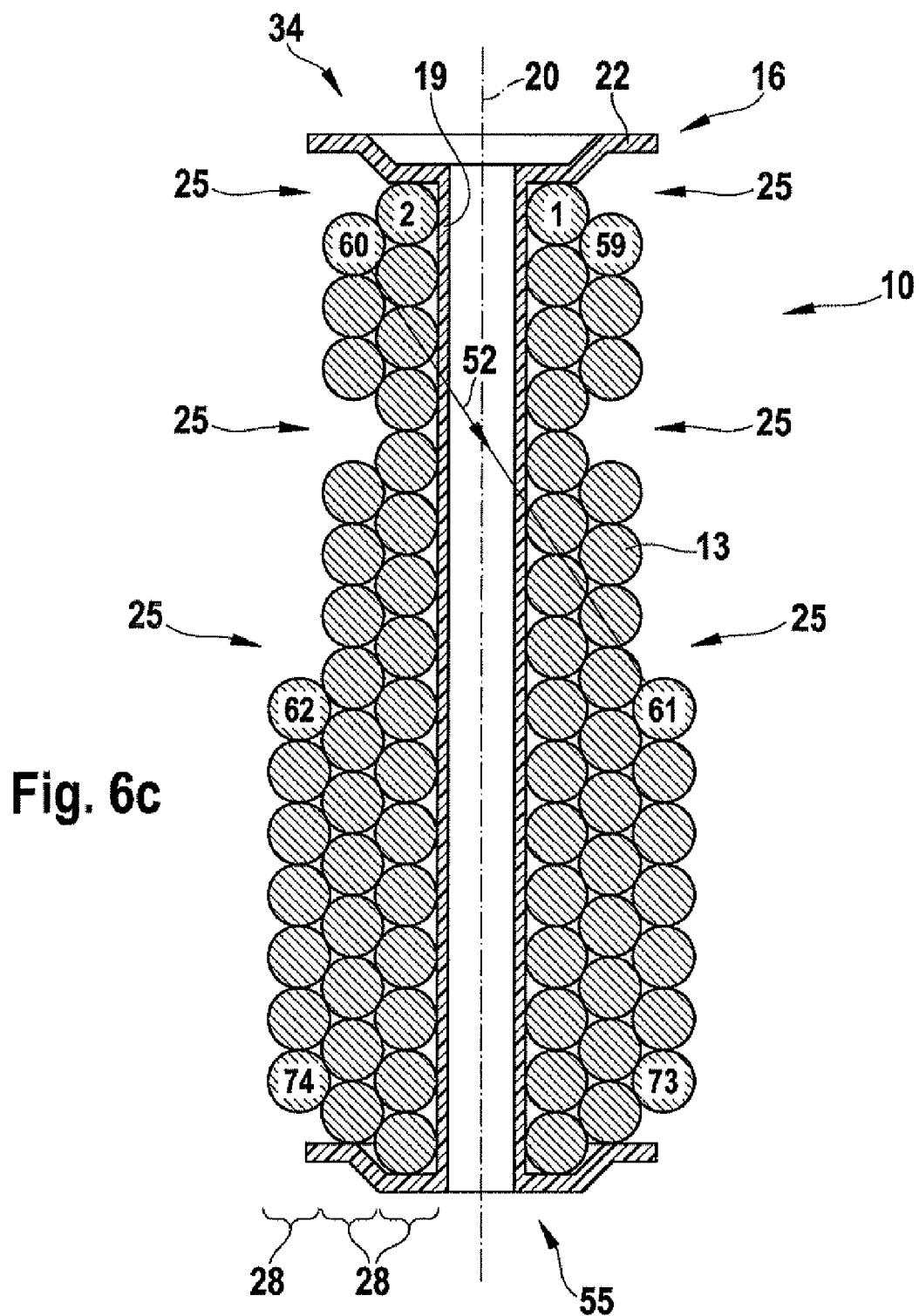
Figure 6D:
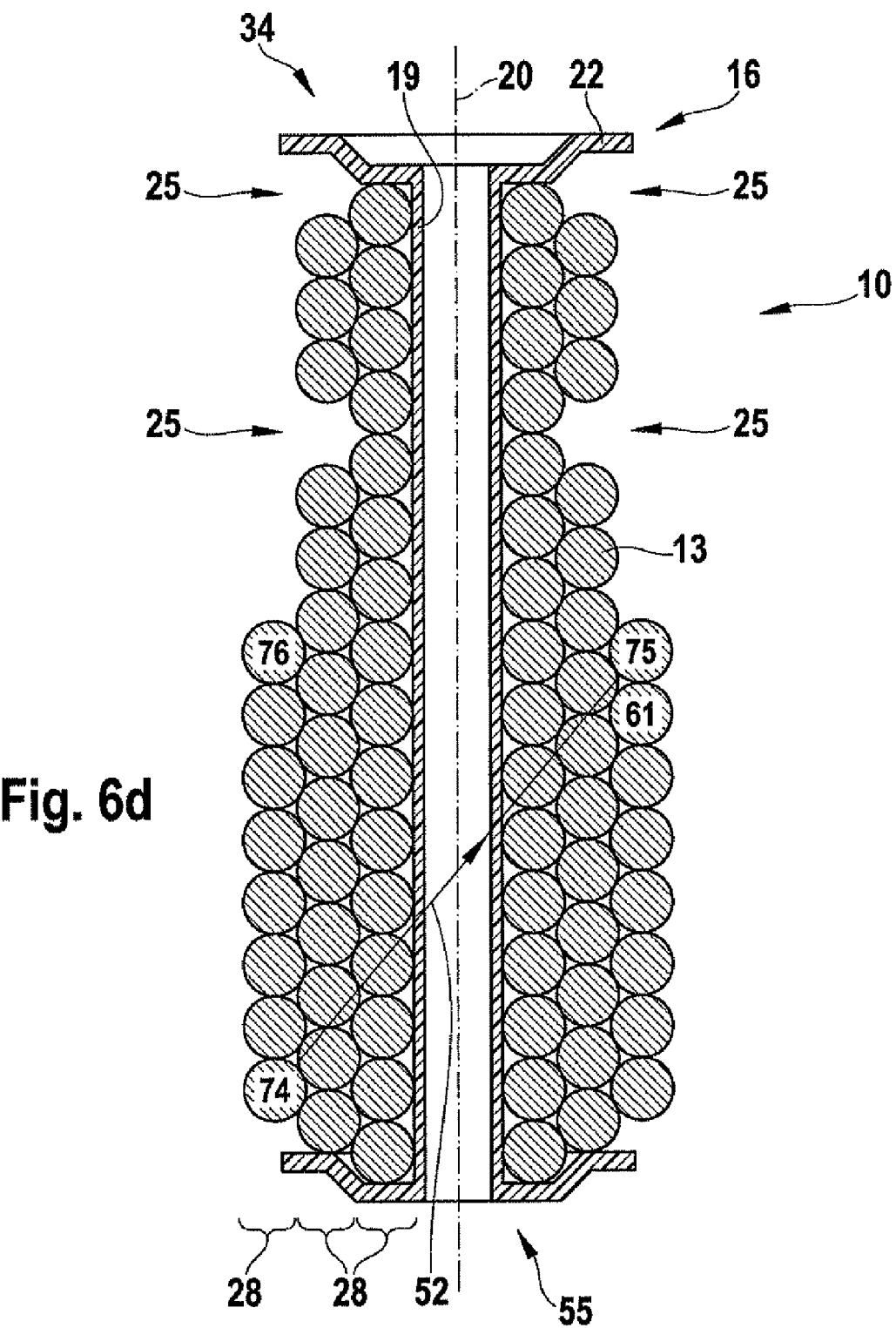
Figure 6E:
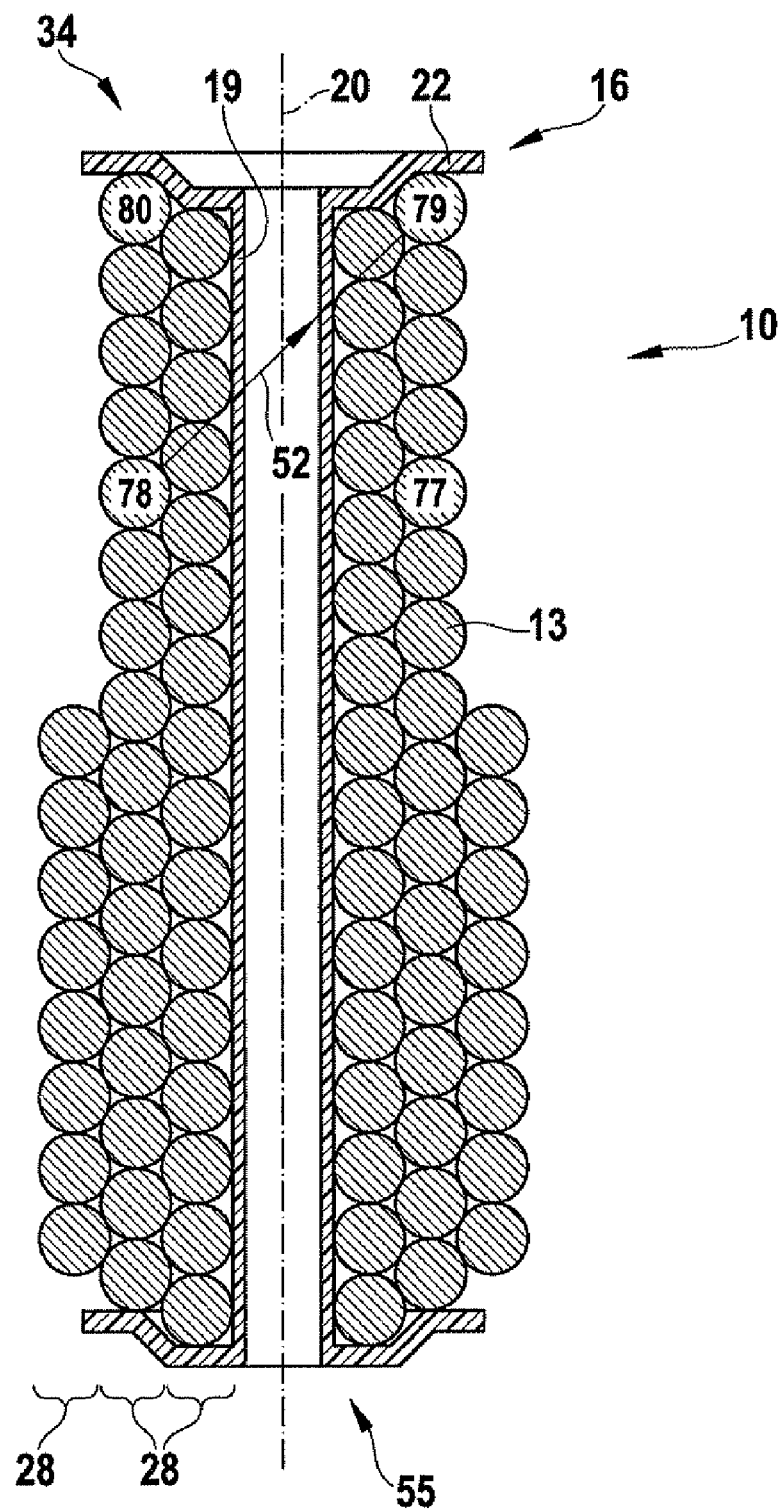

In the next exemplary embodiment according to FIGS. 6a, b, c, d and e, a coil 10 having at least three winding layers 28 is shown; however, the outermost winding layer is wound only onto a portion of coil 10. Both the outermost winding layer 28 and winding layer 28 disposed immediately underneath it have at least one winding gap 25 each. This special exemplary embodiment is an exemplary embodiment that applies to more general developments by way of example. The coil need not necessarily have only three winding layers but may also have five, seven, nine or eleven or more winding layers 28 of an uneven number. The remark that outermost winding layer 28 is wound only across a portion of coil 10 means that outermost winding layer 28 is wound across a particular section of the length of coil 10, and another section is not wound by outermost winding layer 25.

The winding of coil 10 according to FIG. 6 is implemented as indicated by position numbers 1 etc. In other words, initially an innermost winding layer 28 is wound around sleeve section 19 from position number 1 up to and including position 32, in order to then transition from there into second, and in this case, second-to-last, winding layer 28 having position number 33. Starting from this position number 33, this second winding layer 28 is wound without interruption up to and including position number 54, to then provide two winding gaps 25 between two windings, which are disposed at both sides of sleeve section 19. Following these two winding gaps 25, second winding layer 28 continues with three additional windings (position numbers 55 to 60), in order to then leave two additional winding gaps 25 at first end 34 of coil 10. From position number 60, a wire crossing 52 is then placed at a specific position (position number 61) of outermost winding layer 28, and the outermost layer is wound from there up to second end 55 of coil 10. For practical purposes, position 61 is the position where third winding layer 28 begins initially. Once third winding layer 28 has been wound completely (position 74), then beginning at this position 74, an additional wire crossing 52 is wound onto wire 13, where third winding layer 28 begins temporarily. As a matter of fact, this third winding layer at position 61 is actually the second winding of outermost layer 28 since a winding gap 25 is provided before that. In this case, this winding gap in the outermost winding layer can be seen only when wire 13, following wire crossing 52, is wound onto the winding bearing the position numbers 61 and 62 starting from position 74, by the winding that bears the position numbers 75 and 76, FIG. 6d. Starting from position 76, an additional wire crossing 52 is wound into one of winding gaps 25, cf. also positions 77 and 78. Proceeding from position 78, a further wire crossing 52 is placed into first winding gap 25 at first end 34 of coil 10, position 79, in order to complete a final last winding 37 of the second winding layer 28 there, which winding is disposed directly underneath outermost winding layer 28 in this instance. Position 80 is followed only by winding end 49.

Figure 7A:
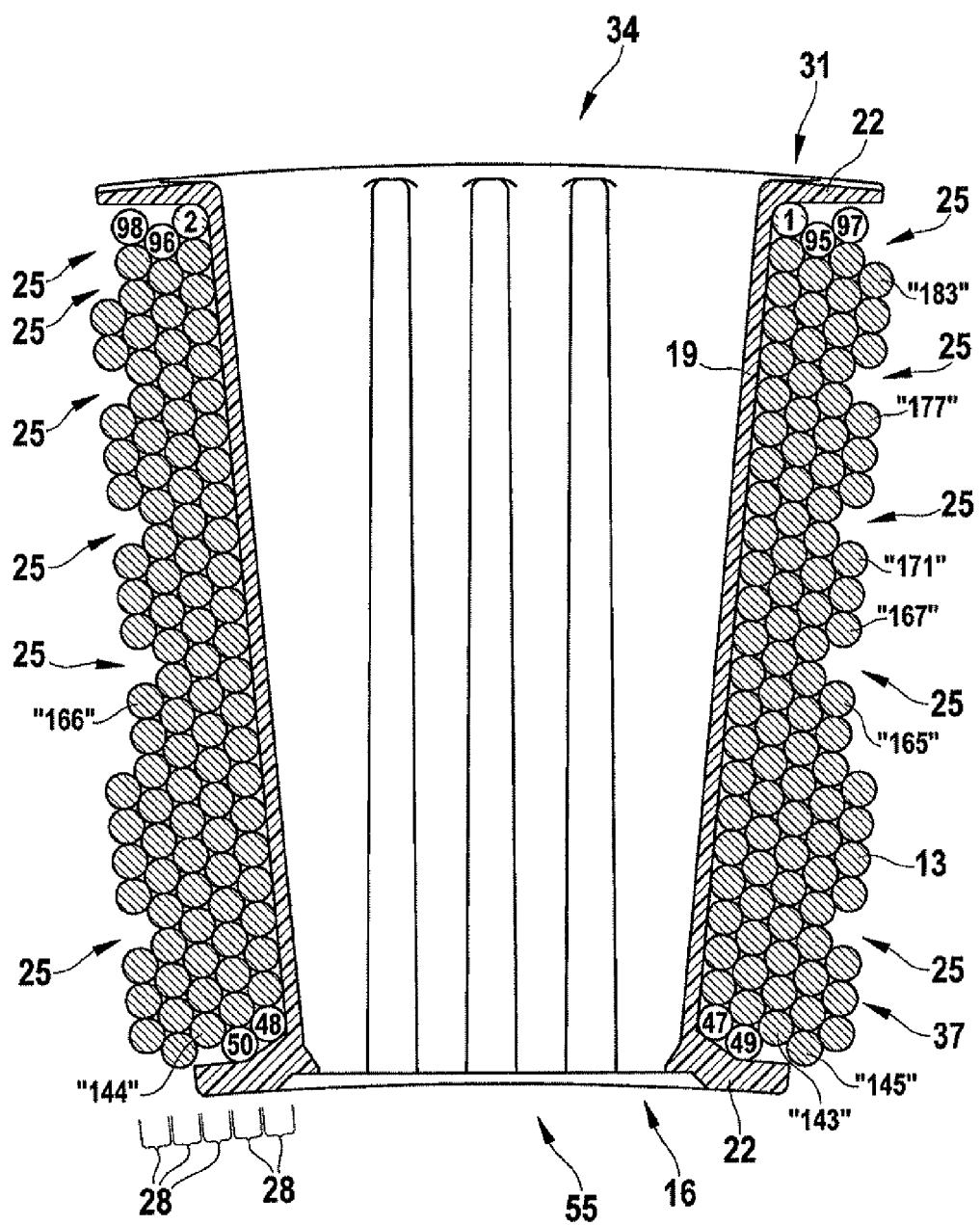
FIGS. 7*a* and *b* show a further exemplary embodiment of a coil, in this instance designed to include five winding layers, the fifth winding layer being incomplete.

FIGS. 7a and b illustrate an additional exemplary embodiment, in which a wire 13 is wound onto a wire holder 16 made of an electrically non-conductive material (plastic). As in all previous exemplary embodiments, wire holder 16 has a sleeve section 19, which transitions into a collar 22 at a first end 34 of coil 10 and at a second end 55 of coil 10. This wire holder 16 is also referred to as coil shell here and is made of an insulating material. Coil 10 or wire holder 16 has a conical interior chamber extending from its one axial end 34 to the other axial end 55, so that coil 10 has cross-sections of different size between its two axial ends 34 and 55.

As already described for all previously described coils 10, the coil begins with a winding start 31 (position 1) at the top on the right, directly at the circumference of sleeve section 19, underneath upper collar 22, which is disposed at first end 34. From there, wire 13 is wound up to position 48, using forty-eight windings initially. This completes the winding of a first winding layer 28. Starting with wire 13 at position 48, the wire is then routed to position 49 in a second winding layer 28, and from there a second winding layer 28 is then wound over first winding layer 28 from second end 55 of coil 10, to finally end at position 96, just before first end 34 of coil 10. Proceeding from there, wire 13 is then placed in third winding layer 28 (position 97). Starting at this position, wire 13 is now wound in third winding layer 28 up to position 143 in order to complete third winding layer 28 in this way. From there, the wire is placed in the fourth winding layer (position 144), whereupon this fourth winding layer is initially wound to position 164 without interruption and without gaps. At this location, fourth winding layer 28 is followed by two winding gaps 25, which in turn are followed by a certain number of windings of wire 13, in this case, three, and then by another two winding gaps 25. This is followed by an additional three windings 37 twice more in this exemplary embodiment, each of these windings being interrupted or followed by winding gaps 25.

Figure 7B:
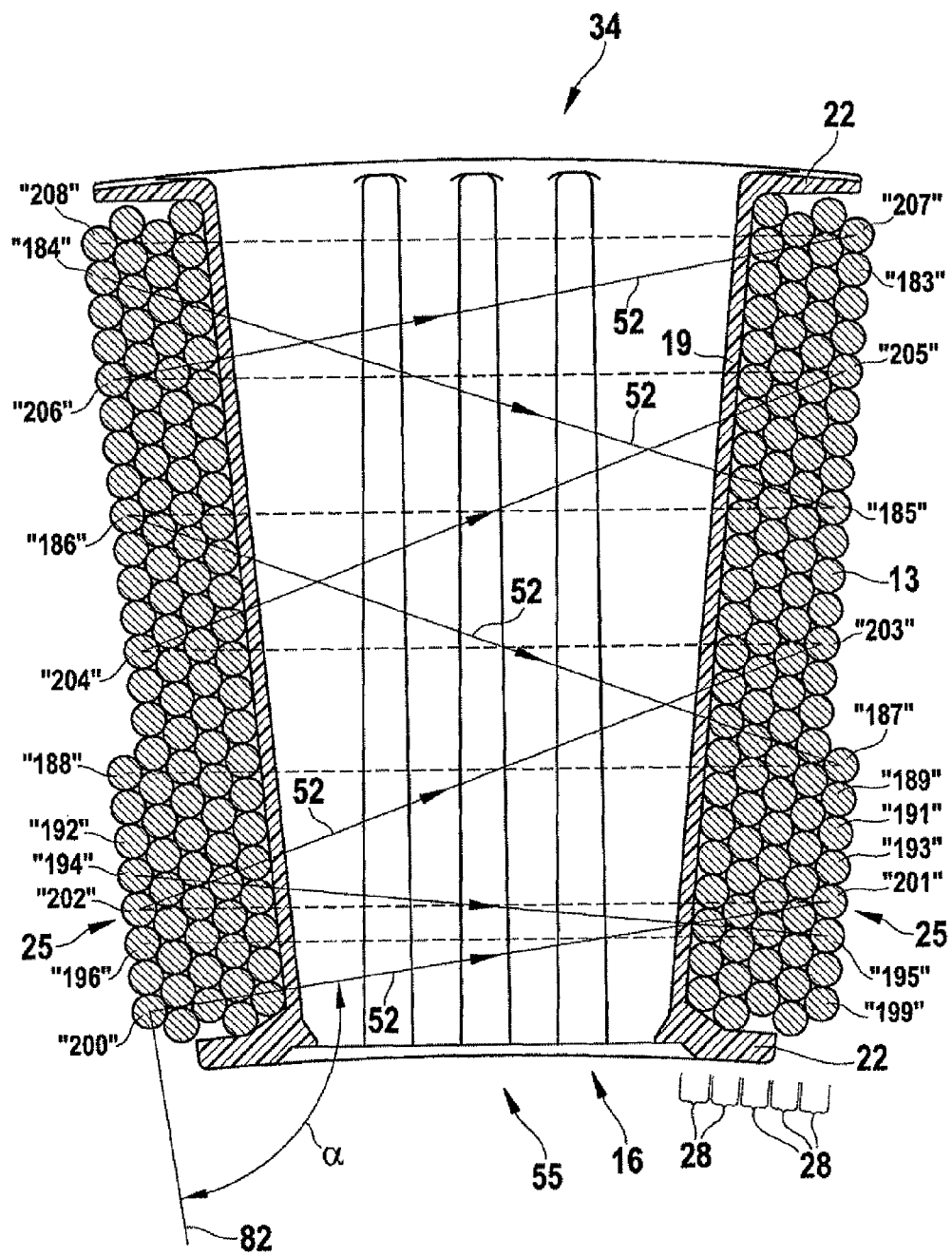

For reasons of clarity, the different position designations before position 183 have been omitted in FIG. 7b. Starting from position 183, wire 13 is placed into second winding gap 25 on the left side of coil 10 when viewed from the direction of first end 34 (position 184), in order to lay from there a first wire crossing 52 towards third winding gap 25 on the right side of coil 10. From there (position 185), wire 13 is wound around third winding layer 28 to position 186, which now occupies fourth winding gap 25. From position 186, an additional wire crossing 52 is placed to position 187, which thereby constitutes the start of fifth winding layer 28 when viewed from the direction of first end 34. According to this exemplary embodiment, starting from this position, a number of windings—in this instance, four—are wound without interruption by a winding gap 25 and without a gap, in order to jump from position 194 to the next but one position 195 on the right side, thereby forming a winding gap 25. In FIG. 7b, this gap 25 is actually occupied, but this will be addressed later on. From position 195 underneath the one winding gap 25, fifth winding layer 28 is wound while forming a second winding gap 25 on the left side of coil 10, using three additional windings and proceeding from position 196 to position 197 and, via position 198, to 199. Thus, fifth winding layer 28 has arrived at second end 55 of coil 10 (200). Wire 13 is then wound into winding gaps 25 when viewed from the direction of the lower or second end 55 of coil 10 (position 201 and 202), to then be placed into the still unoccupied winding gaps 25 in the direction toward first end 34 of coil 10 (positions 203 to 208).

The exemplary embodiment according to FIGS. 7a and 7b thus describes an electromagnetically excitable coil 10, in which the winding layer disposed directly underneath outermost winding layer 28, in this case, fourth winding layer 28, has at least one additional winding gap 25 in which wire 13 is situated in the path between outermost winding layer 28 and the first end of coil 34; the winding layer disposed directly underneath outermost winding layer 28 includes at least one additional winding gap 25 in which wire 13 is situated in the path between first end 34 of the coil and outermost winding layer 28.

As shown in FIGS. 7a and b, outermost incomplete winding layer 28 is disposed at end 55 having the smaller cross-section.

Figure 8:
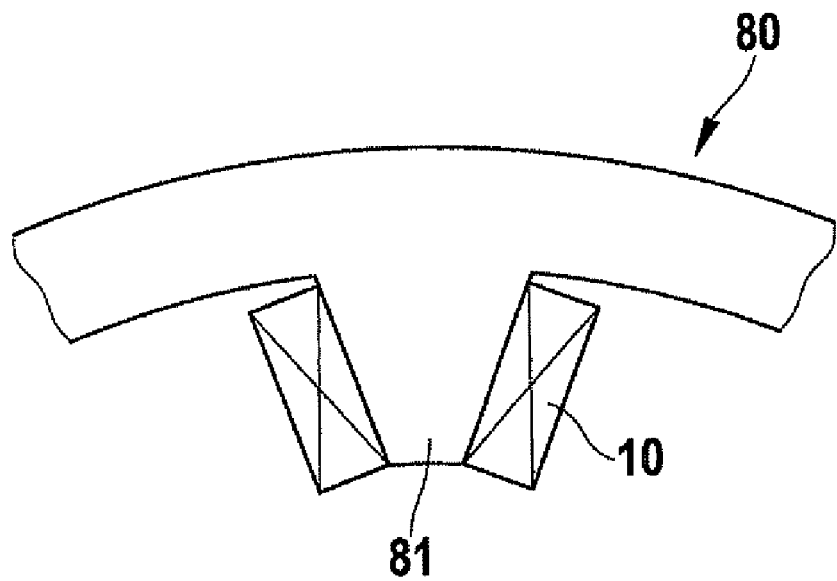
FIG. 8 shows a schematic depiction of an electric machine having a coil according to the present invention.

According to the illustration in FIG. 8, the at least one coil 10 is situated at the inner circumference of a stator 80, and coil 10 surrounds an electromagnetically excitable pole 81 or tooth.

Figure 9:
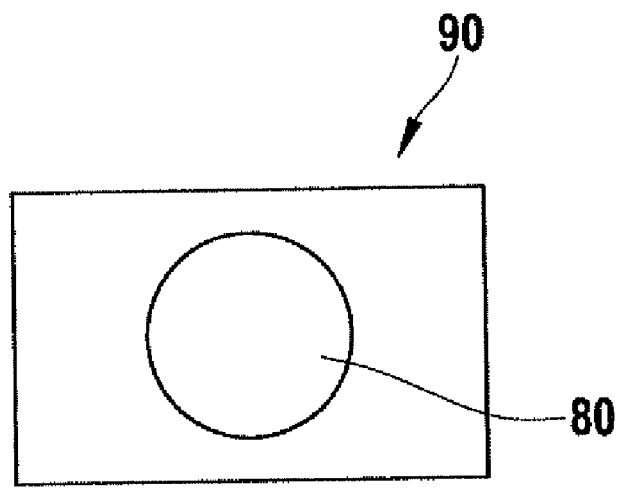
FIG. 9 shows a schematic view of an electric machine having a stator carrying a coil according to the present invention.

FIG. 9 schematically illustrates an electric machine 90 having a stator 80, which carries a coil 10 according to the present invention.

Wire holder 16 need not necessarily be a coil shell made of plastic, which is to be slipped over a gear tooth or an electromagnetically excitable pole 81. Instead, wire 13 may also be wound directly onto the electromagnetically excitable pole in the manner described. It should be pointed out in this context that the term "wire" 13 includes a metal conductor including wire insulation. The wire section forming a wire crossing 52 should have an angle $\alpha$ of between 60° and 120° in relation to a line 82 between two winding layers 28 in order to prevent sliding or shifting after the winding operation.

What is claimed is:

1. An electromagnetically excitable coil, comprising:
a wire holder; and
a wire wound around the wire holder in one winding direction, the wire having a winding start, which is disposed at a first end of the coil, and a winding end, which is disposed at the first end of the coil, using an uneven number of winding layers, the coil having an elongated cross-section and the cross-section having a longer side and a shorter side, the wire being routed from a second end of the coil to the first end of the coil while forming at least one wire crossing at a shorter side of the cross-section;
wherein the coil has at least three winding layers, an outermost winding layer being wound only around a portion of the coil, the outermost winding layer and the winding layer disposed directly underneath each having at least one winding gap.

2. The electromagnetically excitable coil as recited in claim 1, wherein at least a last winding layer is wound forming at least one winding gap, and a section of the wire following the wire crossing is situated in the at least one winding gap before being positioned by its winding end at the first end of the coil.

3. The electromagnetically excitable coil as recited in claim 2, wherein the at least one winding gap is positioned at the first end of the coil.

4. The electromagnetically excitable coil as recited in claim 2, wherein the at least one winding gap is positioned between the first end and the second end of the coil.

5. The electromagnetically excitable coil as recited in claim 2, wherein the coil has complete winding layers exclusively, an outermost winding layer having at least one winding gap.

6. The electromagnetically excitable coil as recited in claim 2, wherein the coil has differently sized cross-sections between its two axial ends.

7. The electromagnetically excitable coil as recited in claim 6, wherein the coil has a conically extending interior chamber from one axial end to the other axial end.

8. The electromagnetically excitable coil as recited in claim 7, wherein an outermost, incomplete winding layer is disposed at an end having the smaller cross-section.

9. The electromagnetically excitable coil as recited in claim 1, wherein a winding layer disposed directly underneath the outermost winding layer has at least one additional winding gap in which the wire is disposed in a course between the outermost winding layer and the first end of the coil, and the winding layer disposed directly underneath the outermost winding layer has at least one additional winding gap in which the wire is disposed in a course between the first end of the coil and the outermost winding layer.

10. An electric machine having at least one electromagnetically excitable coil, the coil comprising:
a wire holder; and
a wire wound around the wire holder in one winding direction, the wire having a winding start, which is disposed at a first end of the coil, and a winding end, which is disposed at the first end of the coil, using an uneven number of winding layers, the coil having an elongated cross-section and the cross-section having a longer side and a shorter side, the wire being routed from a second end of the coil to the first end of the coil while forming at least one wire crossing at a shorter side of the cross-section;
wherein the coil has at least three winding layers, an outermost winding layer being wound only around a portion of the coil, the outermost winding layer and the winding layer disposed directly underneath each having at least one winding gap.

11. The electrical machine as recited in claim 10, wherein the at least one coil is disposed at an inner circumference of a stator, and the coil surrounds an electromagnetically excitable pole.

12. The electric machine as recited in claim 10, wherein the wire holder is an electromagnetically excitable pole.

13. The electric machine as recited in claim 10, wherein the wire holder is a coil shell able to be slipped over an electromagnetically excitable pole, the coil shell being made of an insulating material.

* * * * *